(12) United States Patent
Franck et al.

(10) Patent No.: US 10,735,913 B2
(45) Date of Patent: Aug. 4, 2020

(54) SIMULTANEOUS CONTROL OF A GROUP IN A MESH NETWORK

(71) Applicant: Silicon Laboratories Inc., Austin, TX (US)

(72) Inventors: Jørgen Franck, Bagsværd (DK); Jakob Buron, Søborg (DK); Anders Lynge Esbensen, Copenhagen (DK); Mohammad Sadegh Mohammadi, Lyngby (DK); Anders T. Brandt, Søborg (DK)

(73) Assignee: Silicon Laboratories, Inc., Austin, TX (US)

( * ) Notice: Subject to any disclaimer, the term of this patent is extended or adjusted under 35 U.S.C. 154(b) by 0 days.

(21) Appl. No.: 16/127,691

(22) Filed: Sep. 11, 2018

(65) Prior Publication Data

US 2020/0084588 A1    Mar. 12, 2020

(51) Int. Cl.
*H04W 4/06* (2009.01)
*H04L 12/18* (2006.01)
*H04W 84/18* (2009.01)

(52) U.S. Cl.
CPC ............ *H04W 4/06* (2013.01); *H04L 12/189* (2013.01); *H04L 12/185* (2013.01); *H04L 12/1854* (2013.01); *H04L 12/1872* (2013.01); *H04W 84/18* (2013.01)

(58) Field of Classification Search
CPC ....... H04W 4/80; H04W 84/18; H04W 84/12; H04W 76/14; H04W 84/00; H04W 4/06; H04L 12/189
See application file for complete search history.

(56) References Cited

U.S. PATENT DOCUMENTS

| | | | |
|---|---|---|---|
| 6,917,985 B2 | 7/2005 | Madruga et al. | |
| 7,016,351 B1* | 3/2006 | Farinacci | H04L 45/00 370/312 |
| 7,184,421 B1* | 2/2007 | Liu | H04L 12/189 370/254 |
| 7,403,492 B2 | 7/2008 | Zeng et al. | |
| 8,411,608 B2 | 4/2013 | Moscibroda et al. | |
| 2005/0232281 A1 | 10/2005 | Rosenzweig et al. | |
| 2009/0201844 A1* | 8/2009 | Bhatti | H04L 12/185 370/312 |
| 2009/0303902 A1 | 12/2009 | Liu et al. | |
| 2013/0034039 A1* | 2/2013 | Wong | H04L 12/189 370/312 |
| 2015/0201323 A1* | 7/2015 | Tjahjono | H04W 8/186 370/312 |
| 2016/0277201 A1* | 9/2016 | Thubert | H04L 12/1881 |

* cited by examiner

*Primary Examiner* — Jaime M Holliday
(74) *Attorney, Agent, or Firm* — Nields, Lemack & Frame, LLC (57) ABSTRACT

A system and method for transmitting packets to a plurality of network devices that cannot be accessed via a single hop. The system includes a source, which issues a multicast message to those network devices in close proximity, and also transmits an encapsulated multicast message to a distribution node. This encapsulated multicast message may be routed using traditional routing protocols. The distribution node then transmits the multicast message to those network devices within close proximity. The distribution node may also have the ability to transmit singlecast messages to those network devices, if necessary, to perform retries.

16 Claims, 12 Drawing Sheets

FIG. 10

SIMULTANEOUS CONTROL OF A GROUP IN A MESH NETWORK

FIELD

This disclosure describes systems and methods for simultaneously controlling a group of network devices in a mesh network.

BACKGROUND

In most wireless networks, data is communicated between devices using packets of information. In certain embodiments, packets are transmitted from a source to a specific destination through the use of a routing protocol. In other embodiments, packets are transmitted from a source to a plurality of destinations simultaneously through the use of multicast messages.

An example of the use of multicast messages in smart home applications occurs when a controller (e.g. switch) wants to turn on or off a group of lights. The controller issues a multicast message that is intended for all of the network devices associated with the group of lights. By using multicast messages, it is perceived by the user that these operations are performed at the same time.

However, in mesh networks, multicast messages are typically limited to direct-range nodes, which are defined as network devices that can be reached in a single hop. A hop is defined as a direct connection between two nodes.

However, in certain embodiments, the network devices to be actuated are not accessible within a single hop. In other words, messages from the controller to these network devices must pass through at least one intermediate node in order to reach the desired network devices.

Consequently, it may not be possible to actuate all of the network devices in an area through the use of a traditional multicast message. Rather, only the network devices in close proximity of the source would be actuated.

Since multicast messages do not typically extend beyond a single hop, in certain embodiments, this situation is handled by having the controller transmit routed singlecast messages to each network device that is outside the transmission range of the controller. A routed message is only which passes through at least one intermediate node before reaching the destination. This may create a great deal of network traffic and may create a perceivable delay in switching on the most remote lights.

Therefore, it would be advantageous if there were a system and method of transmitting a message to a plurality of network devices such that it appears to a user that the network devices received the message simultaneously. Further, it would be beneficial if this system and method did not introduce a large number of spurious packets to be transmitted over the network.

SUMMARY

A system and method for transmitting packets to a plurality of network devices that cannot be accessed via a single hop is disclosed. The system includes a source, which issues a multicast message to those network devices in close proximity, and also transmits an encapsulated multicast message to a distribution node. This encapsulated multicast message may be routed using traditional routing protocols. The distribution node then transmits the multicast message to those network devices within close proximity of it. The distribution node may also have the ability to transmit singlecast messages to those network devices, if necessary, to perform retries.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
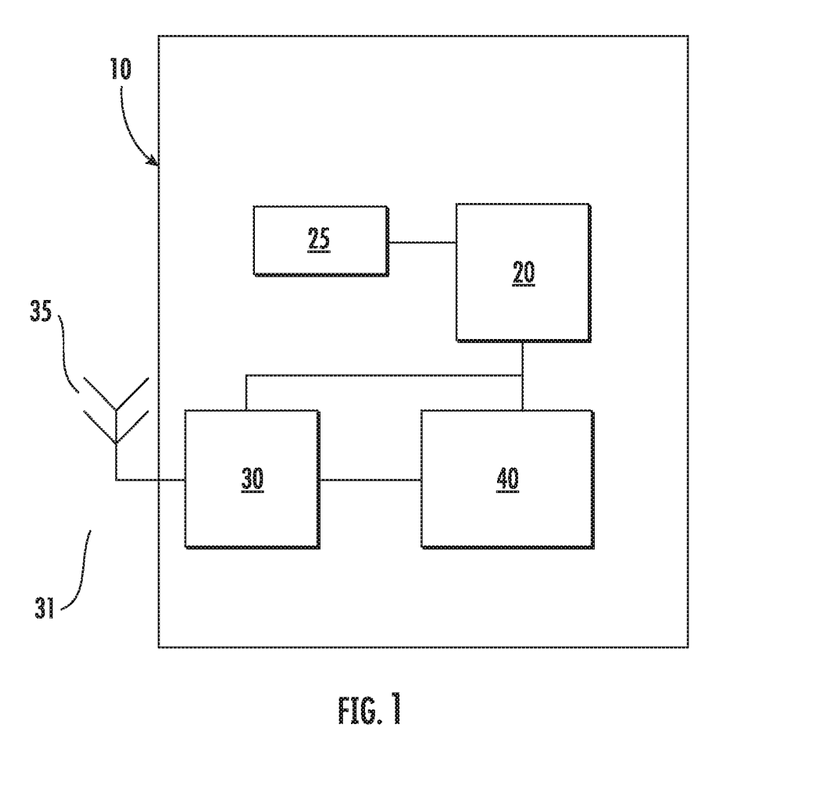
FIG. 1 is a block diagram of a representative network device.

FIG. 1 shows a block diagram of a representative network device 10. This network device may serve as a source node, a distribution node, an intermediate node, or a destination node, as described in more detail below.

As shown in FIG. 1, the network device 10 has a processing unit 20 and an associated memory device 25. The processing unit may be any suitable component, such as a microprocessor, embedded processor, an application specific circuit, a programmable circuit, a microcontroller, or another similar device. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The network device 10 also includes a network interface 30, which may be a wireless interface including an antenna 35. The network interface 30 may support any wireless network that supports multicast, such as Wi-Fi, networks utilizing the IEEE 802.15.4 specification, such as Zigbee, and wireless smart home protocols, such as Z-Wave. The network interface 30 is used to allow the network device to communicate with other devices disposed on the network 31.

The network device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other nodes in the network 31. Although not shown, the network device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the network device 10. The instructions contained on this second computer readable media may be downloaded onto the memory device 25 to allow execution of the instructions by the network device 10.

While the processing unit 20, the memory device 25, the network interface 30, and the second memory device 40 are shown in FIG. 1 as separate components, it is understood that some or all of these components may be integrated into a single electronic component. Rather, FIG. 1 is used to illustrate the functionality of the network device 10, not its physical configuration.

Figure 2:
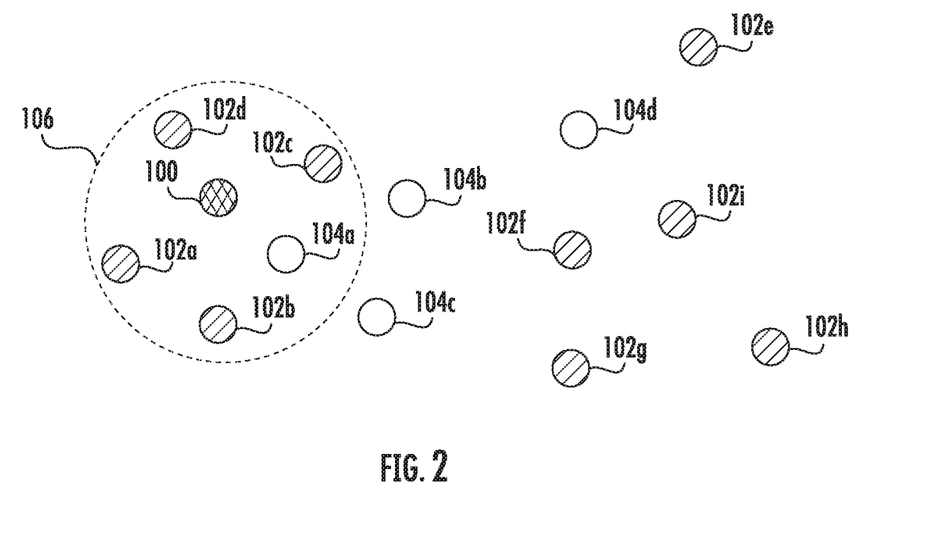
FIG. 2 shows a network having a plurality of network devices, including a source node and a plurality of destination nodes according to one embodiment.

FIG. 2 shows a network having a source node 100 and a plurality of other nodes. In one particular embodiment, this network utilizes the Z-Wave protocol. In another embodiment, this network may utilize a protocol defined by IEEE 802.15.4, such as ZIGBEE®. Some of these nodes are part of the multicast group and are designated as destination nodes 102*a-i*. Other nodes are not part of the multicast group, and are considered non-destination nodes 104*a-d*. Ring 106 indicates the range of transmission by the source node 100. Thus, destination nodes 102*a-d* may be reached by the source node 100 in a single hop. However, destination nodes 102*e-i* cannot be reached directly by the source node 100. In other words, if source node 100 transmits a multicast message, that multicast message is only received by destination nodes 102*a-d*.

For example, assume that destination nodes 102*a-i* are all network devices with an associated light. Assume also that the source node 100 issues a multicast message to all of the destination nodes 102*a-i* instructing them to actuate, or turn on, their respective light. This action will result in the lights that are near the source node 100 turning on, while the remaining lights, associated with destination nodes 102*e-i*, remain dark.

To overcome this shortcoming, a distribution node is identified. This distribution node may be a single hop from the source node 100, or may be multiple hops from the source node 100.

Figure 3:
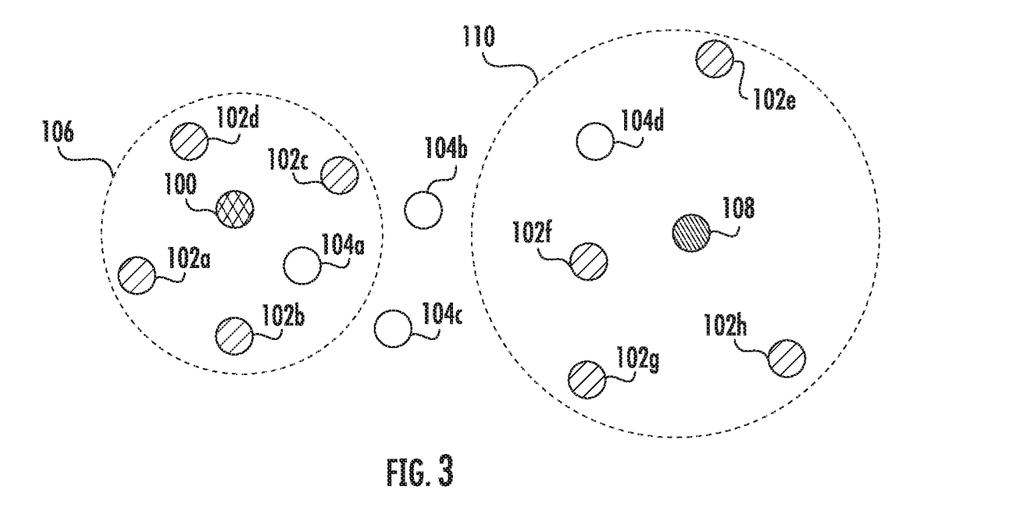
FIG. 3 shows the network of FIG. 2 with a distribution node.

FIG. 3 shows the network of FIG. 2 where one of the nodes has been designated as a distribution node 108. Ring 110 indicates the range of transmission by the distribution node 108. Note that in this embodiment, all of the destination nodes 102*a-i* can be reached by either source node 100 or distribution node 108. Thus, if the multicast message were to be broadcast by both the source node 100 and the distribution node 108, all of the destination nodes 102*a-i* would be accessed.

To accomplish this, the source node 100 transmits a routed multicast message to the distribution node 108. This message may be an encapsulated multicast message. In other words, the message is a multicast message that is disposed in a wrapper that provides routing information from the source node 100 to the distribution node 108.

Figure 9A:
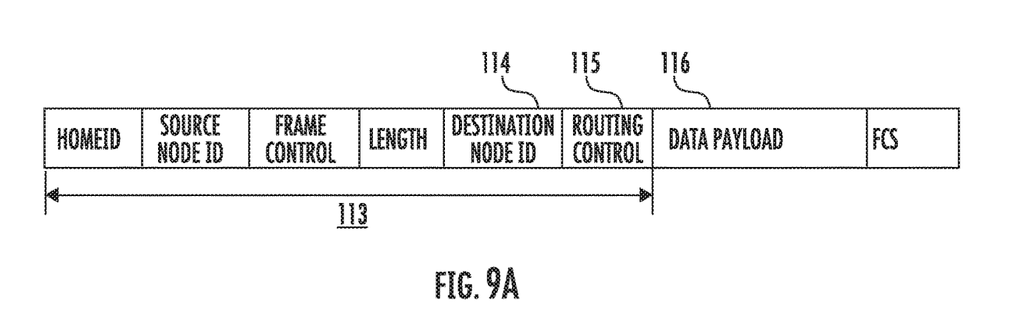
FIGS. 9A-9B show the format of singlecast and multicast messages, respectively, according to one embodiment.
Figure 9B:
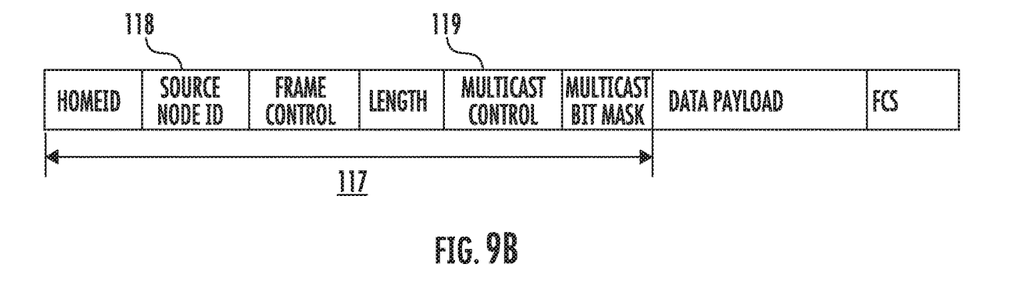

A traditional multicast message, shown in FIG. 9B, has a header 117 that includes the source node ID 118 and the address of the multicast group 119. Thus, any destination node 102*a-i* that is part of the multicast group, and within transmission rage of the source node 100, receives the multicast message.

In certain embodiments, the network protocol may utilize source-based routing, where the source node provides the path that the packet is to take as it traverses the network to the destination node. Thus, in certain embodiments, a routed singlecast message may include a header that includes a list of all of the nodes which the packet is intended to pass through as it travels to the destination.

In the present disclosure, a routed multicast message is disclosed. This message includes the header normally associated with a routed singlecast message, wherein the destination is the distribution node 108. However, within the packet is an indication to the distribution node 108 that it is to multicast the embedded message. One particular embodiment of a routed multicast message is shown in FIG. 9A-9B. FIG. 9A shows a typical routed singlecast message, which includes a header 113. Within the header is the destination node ID 114 and optionally, a Routing Control field 115. The Routing Control field 115 defines the path of the packet from the Source to the Destination. In an alternate embodiment, the path of the packet from the Source to the Destination may be included as part of the Frame Control field. In this alternate embodiment, a separate Routing Control field may not be included in the routed singlecast message. The routed singlecast message also has a data payload 116, which typically follows the header 113. The contents of the data payload 116 are shown in FIG. 9B. FIG. 9B represents the format of a typical multicast message. In one embodiment, the multicast message may form the data payload for a singlecast message.

Figure 4A:
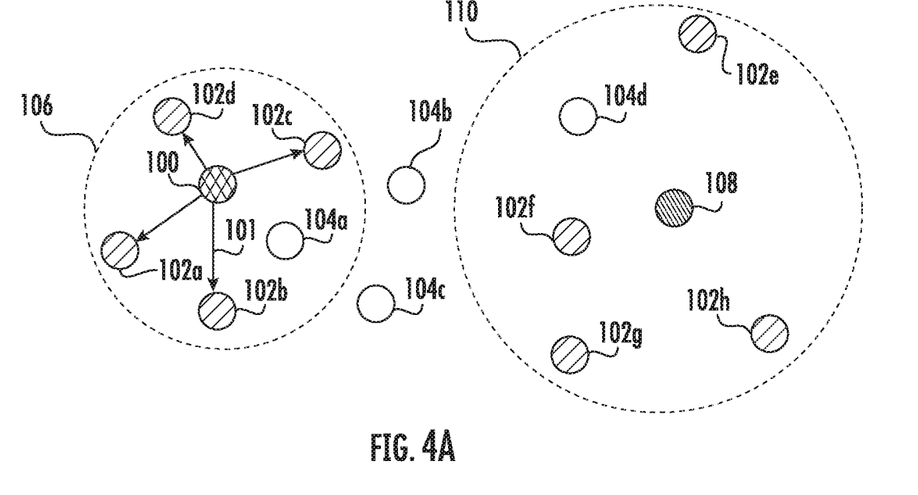
FIGS. 4A-4C show a sequence wherein a message is transmitted to all destination nodes.
Figure 4B:
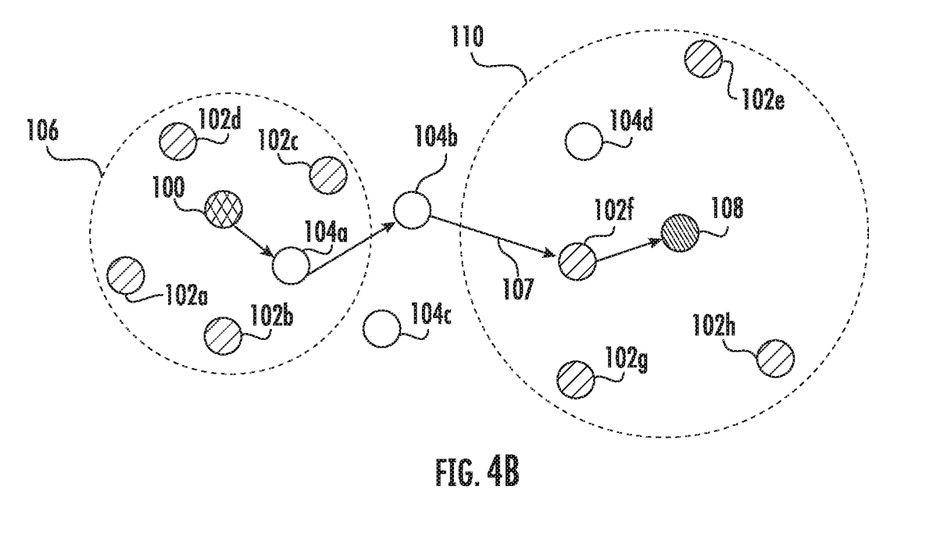
Figure 4C:
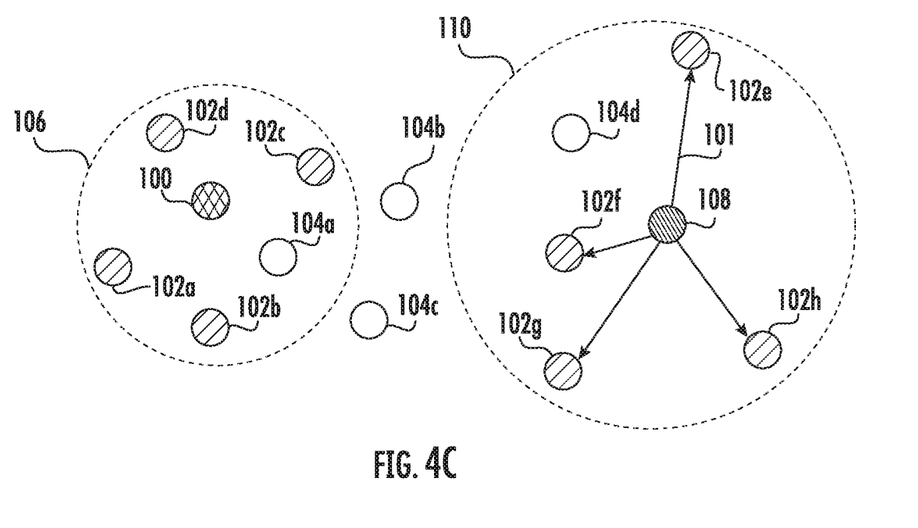

FIGS. 4A-4C show a sequence wherein the message is transmitted to all of the destination nodes 102*a-i*. In FIG. 4A, the source node 100 transmits a multicast message 101 to the desired multicast group. Destination nodes 102*a-d* are within the transmission range of the source node 100, and receive the multicast message 101.

In FIG. 4B, the source node 100 transmits a routed multicast message 107 to distribution node 108. This routed multicast message may traverse several intermediate nodes, such as non-destination nodes 104*a-b* and destination node 102*f* before reaching the distribution node 108. In certain embodiments, the intermediate nodes simply forward this routed multicast message 107 to the next node. However, in other embodiments, one or more of these intermediate nodes may also serve as a distribution node, as described in more detail below. The routed multicast message may have the format of the packet shown in FIG. 9A, where the Source Node ID refers to the source node 100 and the Destination Node ID refers to the destination node 102*f*. The data payload 116 of the routed multicast message may appear to be similar to the format of the multicast message shown in FIG. 9B.

In another embodiment, the data payload 116 may include two fields: a non-encrypted multicast group identification and an encrypted data payload. The distribution node 108 will compose and transmit a multicast frame of the format shown in FIG. 9B with the encrypted data payload and multicast group identification inserted.

In FIG. 4C, the distribution node 108 parses the routed multicast message 107 and transmits the multicast message 101 to the desired multicast group. Destination nodes 102e-h are within the transmission range of the distribution node 108 and receive the multicast message 101. Note that in this illustrative example, the distribution node 108 is also a destination node 102i. However, in other embodiments, the distribution node 108 does not need to be part of the multicast group.

Further, the sequence described above may be performed in a different order. For example, the routed multicast message 107 shown in FIG. 4B may be transmitted prior to the source node 100 transmitting the multicast message 101, shown in FIG. 4A. Further, the source node 100 and the distribution node 108 may transmit the multicast message simultaneously, or one may transmit the multicast message 101 before the other. The only requirement is that the routed multicast message 107 must be transmitted prior to the distribution node 108 transmitting the multicast message 101.

In certain embodiments, the source node 100 may expect to receive acknowledgment packets from each destination node 102a-d after transmitting the multicast message 101. If one or more of the destination nodes 102a-d does not return an acknowledgment, the source node 100 transmits a singlecast message to that non-responsive node. The singlecast message contains the same command as was in the original multicast message 101. The source node 100 then waits for an acknowledgment packet from the non-responsive node after transmission of the singlecast message. The source node 100 may repeat this sequence a predetermined number of times before determining that the non-responsive node is no longer available.

Thus, in certain embodiments, the distribution node 108 must implement this functionality as well. In other words, referring to FIG. 4C, after the distribution node 108 transmits the multicast message 101 to the destination nodes 102e-h, it waits for an acknowledgment packet from each one of those destination nodes. The distribution node 108 follows up with any destination node that does not send an acknowledgment packet by transmitting a singlecast message to that node or nodes. This sequence is repeated in the same manner as is done by the source node 100.

Figure 10:
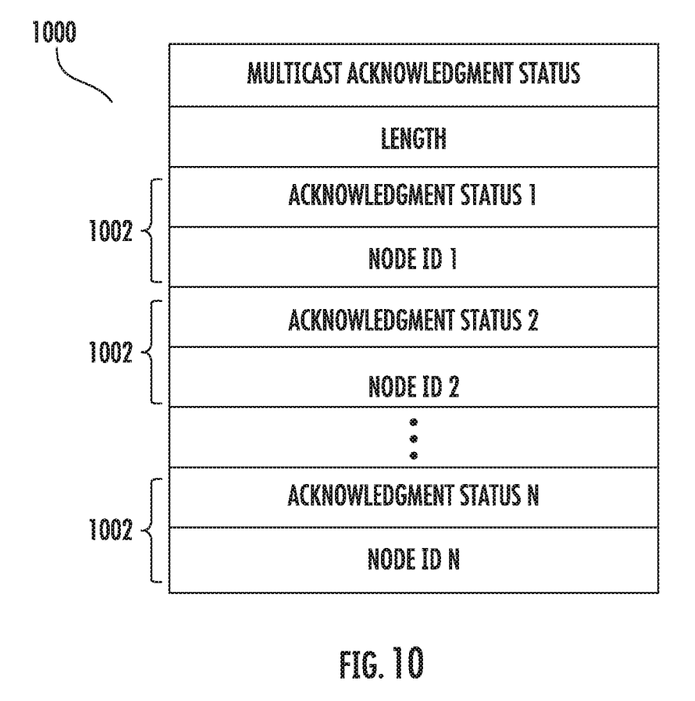
FIG. 10 shows the format of an aggregated acknowledgment packet according to one embodiment.

Furthermore, the distribution node 108 needs a mechanism by which to inform the source node 100 as to whether the destination nodes 102e-h all successfully received the multicast message 101. Thus, in one embodiment, the distribution node 108 transmits a plurality of routed acknowledgment packets to the source node 100, where each packet contains the acknowledgment for one specific node. In another embodiment, to reduce traffic, the distribution node 108 may transmit a routed aggregated acknowledgment packet. This aggregated acknowledgment packet contains the status for each destination node 102e-h that the distribution node 108 transmitted the multicast message to. In one embodiment, shown in FIG. 10, the aggregated acknowledgment packet 1000 may comprise a plurality of fields 1002, where each field represents the identity and status of one of the destination nodes. The value of that field may be indicative of whether that destination node received the multicast message.

Figure 5:
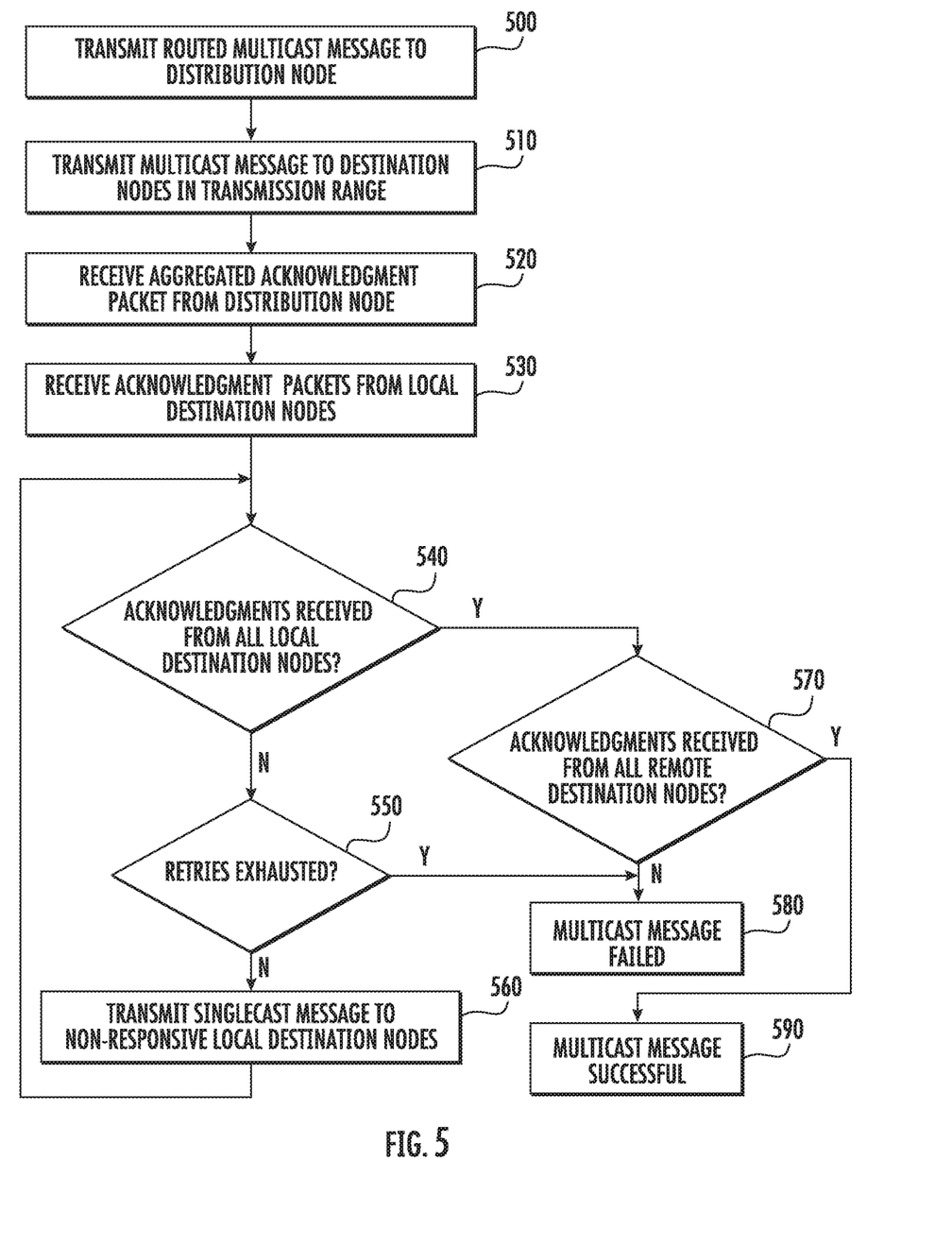
FIG. 5 is a representative flowchart showing the operation of the source node.

FIG. 5 shows a flow diagram of the sequence performed by a source node 100 when transmitting a multicast message to destination nodes, where some of these destination nodes are more than one hop away.

As shown in Box 500, first, the source node 100 transmits the routed multicast message 107 to the distribution node 108. As shown in Box 510, the source node 100 then transmits the multicast message 101, which is received by those destination nodes 102a-d which are within the transmission range of the source node 100. The destination nodes that are within one hop of the source node 100 are referred to as local destination nodes. It is noted that Box 500 and Box 510 may be performed in the opposite order. As shown in Box 520, the source node 100 then receives an aggregated acknowledgment package from the distribution node 108, indicating whether all of the remote destination nodes (i.e. all destination nodes that are not local destination nodes) received the multicast message 101. The aggregated acknowledgment packet also indicates the identity of each remote destination node that did not receive the multicast message 101. The source node 100 also receives acknowledgment packets from each of the local destination nodes, as shown in Box 530. It is noted that the aggregated acknowledgment packet may arrive after the acknowledgment packets from all or some of the local destination nodes. Thus, the timing sequence of Box 520 and Box 530 may vary. After waiting a predetermined time, the source node 100 determines whether acknowledgment packets were received from all of the local destination nodes, as shown in Box 540. If at least one local destination node did not response with an acknowledgment packet, the source node 100 checks if the number of retries to this local destination node have been exhausted, as shown in Box 550. If the number of retries has not been exhausted, the source node 100 transmits singlecast messages to the non-responsive local destination nodes, as shown in Box 560. This process repeats until either acknowledgment packets have been received from all local destination nodes or the number of retries has been exhausted. If all of the acknowledgments have been received from the local destination nodes, the source node 100 then verifies that all of the remote destination nodes also returned an acknowledgment packet, as shown in Box 570. This is done by examining the aggregated acknowledgment packet transmitted by the distribution node 108. If all of the acknowledgments from the remote destinations nodes have been received, the multicast message is successful, as shown in Box 590. However, if the number of retries has been exhausted or acknowledgments have not been received from all of the remote destination nodes, the source node 100 indicates that the multicast message failed, as shown in Box 580. In certain embodiments, an indication may be activated to alert the user and/or application that one of more destination nodes failed to respond to the multicast message.

Figure 6:
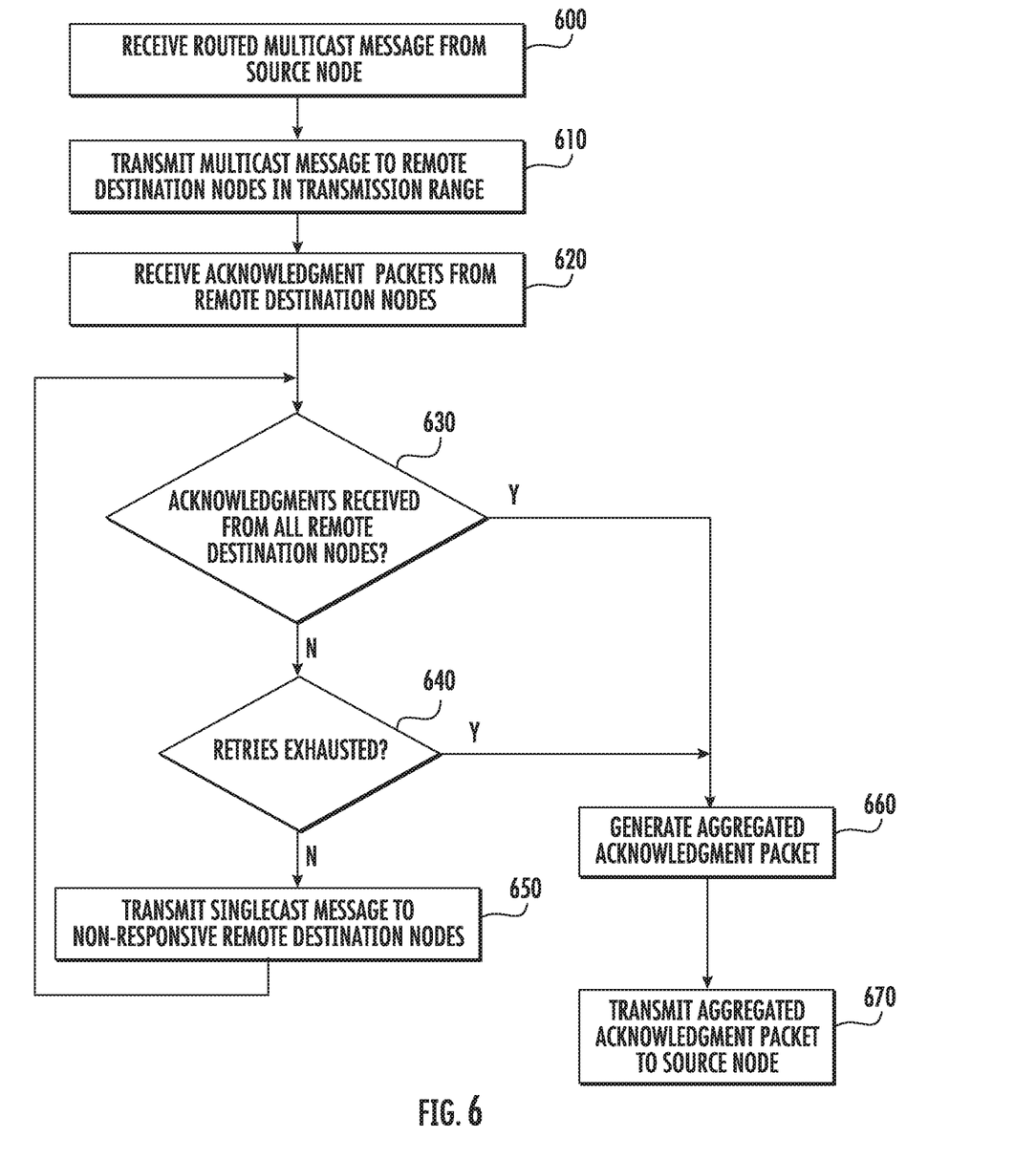
FIG. 6 is a representative flowchart showing the operation of the distribution node.

FIG. 6 shows the flow diagram of the sequence performed by a distribution node 108 during this multicast process. First, as shown in Box 600, the distribution node 108 receives a routed multicast message from the source node 100. The distribution node 108 then issues the multicast message 101 to all destination nodes within its transmission range, also known as remote destination nodes, as shown in Box 610. The distribution node 108 then waits a predetermined time in order to allow the remote destination nodes to respond with an acknowledgment packet, as shown in Box 620. After this time period, the distribution node 108 checks whether acknowledgment packets have been received from all of the remote destination nodes, as shown in Box 630. If all of these acknowledgment packets have been received, the distribution node 108 generates an aggregated acknowledgment packet, as shown in Box 660. In this case, the aggregated acknowledgment packet indicates that all of the remote destination nodes have received the multicast message. If, after this time period, all of the acknowledgment packets have not been received, the distribution node 108 determines whether all retries have been exhausted, as shown in Box 640. If retries have not been exhausted, the distribution node 108 transmits a singlecast message to each remote destination node that did not respond with an acknowledgment packet, as shown in Box 650. If reties are exhausted, the distribution node 108 generates an aggregated acknowledgment packet, as shown in Box 660. In this case, the acknowledgment package may indicate the specific remote destination nodes that did not receive the multicast message 101. This aggregated acknowledgment packet is then transmitted to the source node 100, as shown in Box 670. This may be done using a routed message.

Thus, FIGS. 4-6 show how a multicast message can be disseminated to physically separated network devices, while minimizing the number of singlecast routed messages that are transmitted over the network.

In order for this new mechanism to be operable, the source node 100 must determine an appropriate node to serve as the distribution node 108. There are several ways that this can be achieved.

In one embodiment, the source node 100 compiles a topology of the network. There are multiple ways that the source node 100 may determine this topology. In one embodiment, each node in the network may report network information to the source node 100. For example, each node may provide its list of neighbors, which are the nodes that are a single hop from that node. Based on this network information, the source node 100 may develop the network topology. Using this network topology, as well as the list of nodes that are part of a multicast group, the source node 100 may be able to identify one or more nodes that may serve as distribution nodes. For example, the source node 100 may select the distribution node for a particular multicast group based on certain criteria, such as:
- the ability of the candidate node to perform the functions of a distribution node;
- whether the candidate node is a member of the multicast group;
- the access of the candidate node to other nodes in the multicast group; and
- the access of the candidate node to nodes that are more than one hop from the source node.

Based on these criteria, the source node 100 may designate one or more nodes as distribution nodes. Each distribution node is provided with a list of the nodes that comprise the multicast group. This information is required so that the distribution node can perform the singlecast message retries, as shown in Box 650. Each distribution node is also provided with the name of the multicast group so that it can correctly capture routed multicast messages sent by the source node 100.

Figure 7:
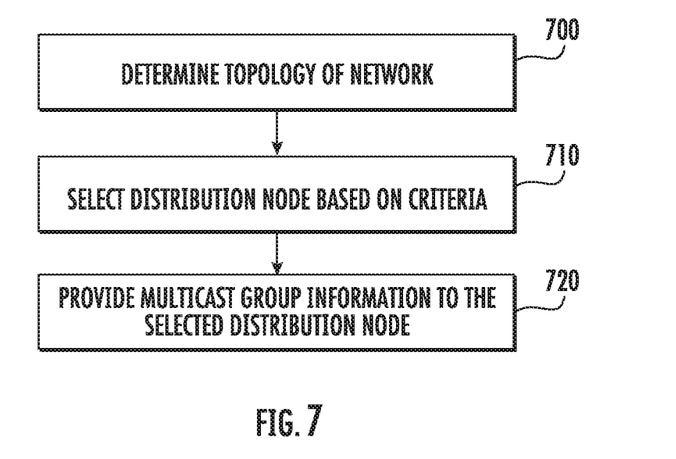
FIG. 7 shows the operation of the source node in determining the distribution node.

FIG. 7 shows the flow chart of the sequence used by the source node 100 to identify and designate the distribution nodes. First, as shown in Box 700, the source node 100 determines the topology of the network. This topology includes an address of each node in the network, and the immediate neighbors of each of these nodes. This network information may also include the capabilities of each node, such as whether it is a sleepy node, a frequently listening receiver slave, or other type of device.

Next, as shown in Box 710, the source node 100 determines which of the nodes should be a distribution node, based on various criteria, such as that described above. Then, as shown in Box 720, the source node 100 transmits various information to the selected nodes in order to enable them to operate as distribution nodes. This information includes the name of the multicast group, the nodes that are part of that multicast group and other related information.

Figure 8:
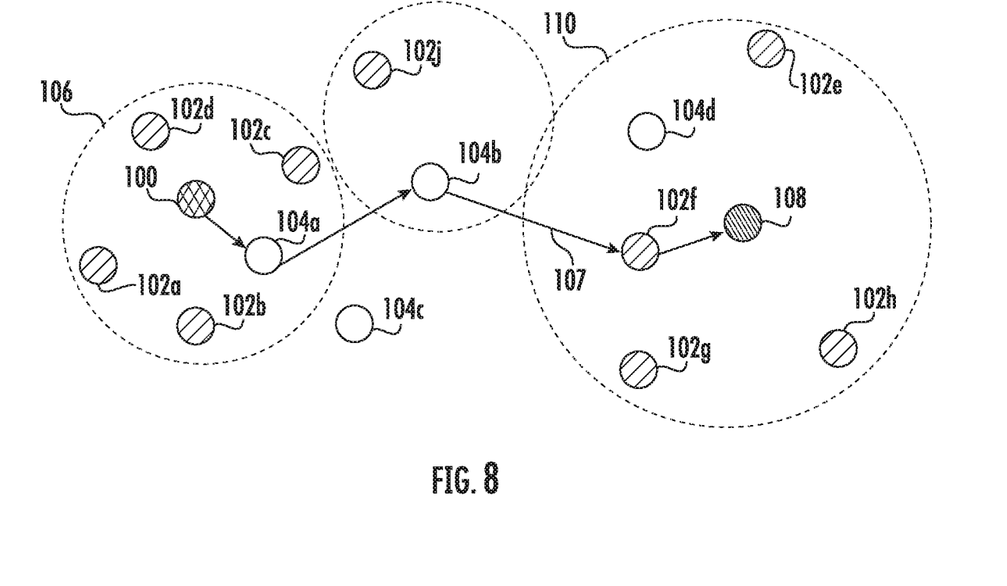
FIG. 8 shows the network of FIG. 2 with a second distribution node.

Further, various enhancements are also possible. For example, FIG. 8 shows a network similar to that shown in FIG. 2. However, a new destination node 102*j* has been added, which is outside the transmission range of both the source node 100 and the distribution node 108. In one embodiment, non-destination node 104*b*, which is part of the route from the source node 100 to the distribution node 108, may also serve as a distribution node. In this embodiment, the non-destination node 104*b* performs all of the functions described above for a distribution node. It also performs the function of forwarding the routed multicast message to the distribution node 108.

While FIG. 8 shows a non-destination node 104*b* operating as both a routing node for the routed multicast message and a distribution node, other embodiments are also possible. For example, a destination node may be used to perform the dual functions described above.

The present system has many advantages. Traditionally, the source node may attempt to send a multicast message to all of the nodes shown in FIG. 2. Because of their distance from the source node 100, destination nodes 102*e-i* do not receive the multicast message. Since acknowledgment packets are not received from the destination nodes 102*e-i*, the source node 100 must initiate retries, which are typically routed singlecast messages. Thus, for destination node 102*e*, the singlecast retransmission is routed from the source node 100, through nodes 102*c*, 104*b*, and 104*d*. Likewise, the acknowledgment packet from destination node 102*e* must traverse these same intermediate nodes. This occurs for all of the destination nodes outside the transmission range of the source node 100. In contrast, the present system uses one or more distribution nodes to minimize the amount of traffic in the network, and more specifically to allow more multicast messages to be sent, rather than using a plurality of routed singlecast messages. This improves latency and reduces traffic in the network.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of transmitting a multicast message within a wireless mesh network comprising a plurality of network devices, wherein the wireless mesh network comprises a first network device, which functions as a source node for the multicast message, a second network device, which functions as a distribution node for the multicast message, and one or more additional network devices; the method comprising:
   transmitting, from the source node, a multicast message to those additional network devices in the wireless mesh network disposed within a transmission range of the source node, known as local destination nodes;

transmitting, from the source node, a routed multicast message to the distribution node disposed in the wireless mesh network, wherein the distribution node is multiple hops from the source node, and wherein the routed multicast message comprises the multicast message encapsulated with a header that contains singlecast routing information; and transmitting, from the distribution node, the multicast message to those additional network devices in the wireless mesh network disposed within the transmission range of the distribution node, known as remote destination nodes.

2. The method of claim 1, further comprising:
receiving, at the distribution node, acknowledgment packets from at least one of the remote destination nodes;
creating an aggregated acknowledgment packet from the acknowledgment packets; and
transmitting the aggregated acknowledgment packet from the distribution node to the source node.

3. The method of claim 2, wherein the aggregated acknowledgment packet comprises a plurality of fields, wherein each field represents whether a specific remote destination node received the multicast message.

4. The method of claim 2, further comprising:
determining, at the distribution node, that a first remote destination node did not transmit an acknowledgment packet;
transmitting, from the distribution node, a singlecast message to the first remote destination node; and
waiting for an acknowledgment packet from the first remote destination node.

5. The method of claim 4, wherein the determining, transmitting and waiting steps are repeated until either an acknowledgment packet is received by the distribution node or a predetermined number of retries is exhausted.

6. The method of claim 1, wherein the wireless mesh network utilizes Z-WAVE protocol.

7. The method of claim 1, wherein use of the distribution node reduces traffic in the wireless mesh network while ensuring that all of the one or more additional network devices in the wireless mesh network receive the multicast message.

8. A network device, comprising:
a wireless network interface to communicate on a wireless mesh network;
a processing unit;
a memory device, containing instructions, which when executed by the processing unit, allow the network device to:
transmit a multicast message to additional network devices disposed in the wireless mesh network within a transmission range of the network device, known as local destination nodes; and
transmit a routed multicast message to a second network device in the wireless mesh network, known as a distribution node, wherein the distribution node is multiple hops from the source node and wherein the routed multicast message comprises the multicast message encapsulated with a header that contains singlecast routing information.

9. The network device of claim 8, wherein the memory device further contains instructions, which when executed by the processing unit, allow the network device to:
determine a topology of the wireless mesh network;
select the distribution node based on criteria; and
provide multicast group information to the distribution node.

10. The network device of claim 9, wherein the criteria is selected from the group consisting of an ability of a candidate node to perform functions of a distribution node; whether the candidate node is a member of the multicast group; the access of the candidate node to other nodes in the multicast group; and access of the candidate node to nodes that are more than one hop from the network device.

11. The network device of claim 8, wherein the network device utilizes Z-WAVE protocol.

12. A network device, comprising:
a wireless network interface to communicate on a mesh network;
a processing unit;
a memory device, containing instructions, which when executed by the processing unit, allow the network device to:
receive a routed multicast message from a second network device, known as a source node, wherein the network device and the second network device are part of the mesh network and the network device is multiple hops from the source node and wherein the routed multicast message comprises the multicast message encapsulated with a header that contains singlecast routing information; and
transmit a multicast message to additional network devices disposed in the mesh network within a transmission range of the network device, known as remote destination nodes.

13. The network device of claim 12, wherein the memory device further contains instructions, which when executed by the processing unit, allow the network device to:
determine that a first remote destination node did not transmit an acknowledgment packet;
transmit a singlecast message to the first remote destination node; and
wait for an acknowledgment packet from the first remote destination node.

14. The network device of claim 12, wherein the memory device further contains instructions, which when executed by the processing unit, allow the network device to:
receive acknowledgment packets from at least one of the remote destination nodes;
create an aggregated acknowledgment packet from the acknowledgment packets; and
transmit the aggregated acknowledgment packet to the source node.

15. The network device of claim 14, wherein the aggregated acknowledgment packet comprises a plurality of fields, wherein each field represents whether a specific remote destination node received the multicast message.

16. The network device of claim 12, wherein the network device utilizes Z-WAVE protocol.

* * * * *